United States Patent
Seiler et al.

(10) Patent No.: US 6,253,837 B1
(45) Date of Patent: Jul. 3, 2001

(54) BY-PASS VALUES FOR HEAT EXCHANGER

(75) Inventors: Thomas F. Seiler, Milton; Dario Bettio, Mississauga; Yuri Peric, Oakville, all of (CA)

(73) Assignee: Long Manufacturing Ltd., Oakville (CA)

( * ) Notice: Subject to any disclaimer, the term of this patent is extended or adjusted under 35 U.S.C. 154(b) by 0 days.

(21) Appl. No.: 09/591,343

(22) Filed: Jun. 9, 2000

Related U.S. Application Data

(63) Continuation of application No. 09/045,891, filed on Mar. 23, 1998.

(51) Int. Cl.[7] .................................................. F28F 27/02
(52) U.S. Cl. ......................... 165/103; 165/297; 165/283; 137/623.29
(58) Field of Search ........................ 165/280, 283, 165/297, 103; 137/625.29, 271, 557

(56) References Cited

U.S. PATENT DOCUMENTS

| | | | |
|---|---|---|---|
| 979,618 | * | 12/1910 | Weir ...................................... 165/283 |
| 2,159,468 | * | 5/1939 | Young et al. ........................ 165/283 |
| 2,396,053 | * | 3/1946 | Mcentire ............................... 135/280 |
| 2,433,454 | * | 12/1947 | Hoffman .............................. 165/283 |
| 2,469,212 | * | 5/1949 | Shaw ..................................... 165/297 |
| 3,440,833 | * | 4/1969 | Fernandes ............................ 165/297 |
| 3,949,777 | * | 4/1976 | Caldwell .............................. 137/271 |
| 4,024,909 | * | 5/1977 | Hofmann, Jr. ......................... 165/35 |
| 4,027,643 | | 6/1977 | Feenan et al. . |
| 4,190,198 | | 2/1980 | Casuga et al. . |
| 4,816,083 | * | 3/1989 | Bangyan .............................. 137/271 |
| 4,846,219 | * | 7/1989 | Schaefer .............................. 137/557 |
| 4,972,877 | * | 11/1990 | Halemba et al. ............... 137/625.29 |
| 5,139,050 | * | 8/1992 | Otto ................................. 137/625.29 |
| 5,423,373 | * | 6/1995 | Ramberg ............................. 165/132 |
| 5,746,170 | | 5/1998 | Moriya . |

FOREIGN PATENT DOCUMENTS

| | | |
|---|---|---|
| 296 19 609 U | 1/1997 | (DE) . |
| 0 138 618 | 4/1985 | (EP) . |

* cited by examiner

*Primary Examiner*—Ira S. Lazarus
*Assistant Examiner*—Terrell McKinnon
(74) *Attorney, Agent, or Firm*—Ridout & Maybee

(57) ABSTRACT

A by-pass valve and a heat exchanger employing same is disclosed where the by-pass valve makes a short circuit from the heat exchanger inlet to the heat exchanger outlet to disable the heat exchanger under certain temperature conditions. The by-pass valve includes a housing defining a chamber. Three main ports communicate with the chamber, one being a valve port. A temperature responsive actuator located in the chamber operates a spring loaded valve to open and close the valve port. The valve port can be connected to one of the heat exchanger inlet or outlet, the other main ports are then connected in series with the other of the heat exchanger inlet or outlet.

12 Claims, 6 Drawing Sheets

BY-PASS VALUES FOR HEAT EXCHANGER

This is a continuation of application Ser. No. 09/045,891 filed Mar. 23, 1998.

BACKGROUND OF THE INVENTION

This invention relates to heat exchangers, and in particular, to by-pass valves for by-passing a heat exchanger in a heat exchange circuit under conditions where the heat transfer function of the heat exchanger is not required or is only intermittently required.

In certain applications, such as in the automotive industry, heat exchangers are used to cool or heat certain fluids, such as engine oil or transmission fluid or oil. In the case of transmission fluid, for instance, a heat exchanger is used to cool the transmission fluid. The heat exchanger is usually located remote from the transmission and receives hot transmission oil from the transmission through supply tubing, cools it, and delivers it back to the transmission again through return tubing. However, when the transmission is cold, such as at start-up conditions, the transmission oil is very viscous and does not flow easily through the heat exchanger, if at all. In such cases, the transmission can be starved of oil and this may cause damage or at the least erratic performance. Cumulative damage to the transmission can also occur if the quantity of oil returned is adequate, but is overcooled due to low ambient temperatures. In this case, for instance, moisture condensation in the oil (that would otherwise be vaporized at higher temperatures) may accumulate and cause corrosion damage or oil degradation.

In order to overcome the cold flow starvation problem, various solutions have been proposed in the past. One solution is to use a small by-pass conduit acting as a short circuit between the heat exchanger supply line and the return line to the transmission. While this provides for some cold flow and prevents the transmission from being starved of oil, it reduces the heat exchange efficiency when the transmission fluid reaches operating temperature, because some of the transmission fluid does not go through the heat exchanger. The problem is exacerbated by the changing transmission oil viscosity as the oil heats up. In other words, a by-pass channel large enough to give sufficient flow to prevent starvation at cold temperatures produces too much by-pass flow when the oil heats up and becomes less viscous.

In order to overcome the reduced efficiency caused by simple by-pass channels, it has been proposed to put an actual shut-off valve in the by-pass line.

When the oil is cold, the by-pass channel is open, and when the oil heats up, the valve in the by-pass line closes to prevent further by-pass. Usually some type of temperature responsive valve element is used, such as a bimetallic strip or some other type of device that expands and contracts or rotates to open and close the by-pass valve when the oil temperature exceeds certain limits.

There are several difficulties with the by-pass valves used in the past. With some types of valves, when the valve closes and the by-pass flow stops, the element that senses the oil temperature and causes the valve actuation is either taken out of the flow path or overly exposed to the flow path. In the former case, the valve actuator loses its ability to sense accurately the oil temperature and open and close when desired. In the latter case, the valve actuator is exposed to the oil at the extreme ends of the oil operating temperature range, and this can permanently damage some types of actuators.

Another problem with the actuator valves used in the past is that when they open and close, they can cause pressure peaks or spikes in the flow circuit. This is highly undesirable in transmission oil cooling, because transmission operation is sensitive to pressure, and pressure spikes affect the shifting of the transmission.

The present invention overcomes many of the above problems by placing the by-pass valve temperature responsive actuator in a valve chamber and having the supply or return flow to the heat exchanger pass through this chamber. The by-pass flow also passes through the chamber.

BRIEF SUMMARY OF THE INVENTION

According to one aspect of the invention, there is provided a by-pass valve for a heat exchange circuit, the by-pass valve comprising a housing defining a chamber therein and first, second and third main ports communicating with the chamber. The first main port is a by-pass valve port and has a central axis and a peripheral valve seat. A temperature responsive actuator is located in the chamber and has a reciprocating central shaft disposed along the central axis. The central shaft has a closed end portion for partially closing the valve port. An annular ring is slidably mounted on the closed end portion and extends transversely from the central shaft to engage the valve seat and completely close the valve port. Bias means is provided for urging the annular ring toward the valve seat. A return spring is mounted in the housing below the annular ring and is connected to the central shaft to urge the central shaft end portion to retract and open the valve port.

According to another aspect of the invention, there is provided a heat exchanger comprising an inlet manifold having an inlet opening and an outlet manifold having an outlet opening and a plurality of spaced-apart heat exchange conduits connected between the inlet and outlet manifolds. A by-pass valve includes a housing defining a chamber therein and first, second and third main ports communicating with the chamber. The first main port is a by-pass valve port and has a central axis and a peripheral valve seat. Means are provided connecting the valve port to one of the inlet and outlet openings. A temperature responsive actuator is located in the chamber and has a reciprocating central shaft disposed along the central axis. The central shaft has a closed end portion for partially closing the valve port. An annular ring is slidably mounted on the closed end portion and extends transversely from the central shaft to engage the valve seat and completely close the valve port. Bias means is provided for urging the annular ring toward the valve seat. A return spring is mounted in the housing below the annular ring and is connected to the central shaft to urge the central shaft end portion to retract and open the valve port. Also, means are provided connecting the second main port, the chamber, and the third main port in series with the other of the inlet and outlet openings.

BRIEF DESCRIPTION OF THE DRAWINGS

Preferred embodiments of the invention will now be described by way of example, with reference to the accompanying drawings, in which.

BRIEF DESCRIPTION OF THE PREFERRED EMBODIMENT

Figure 1:
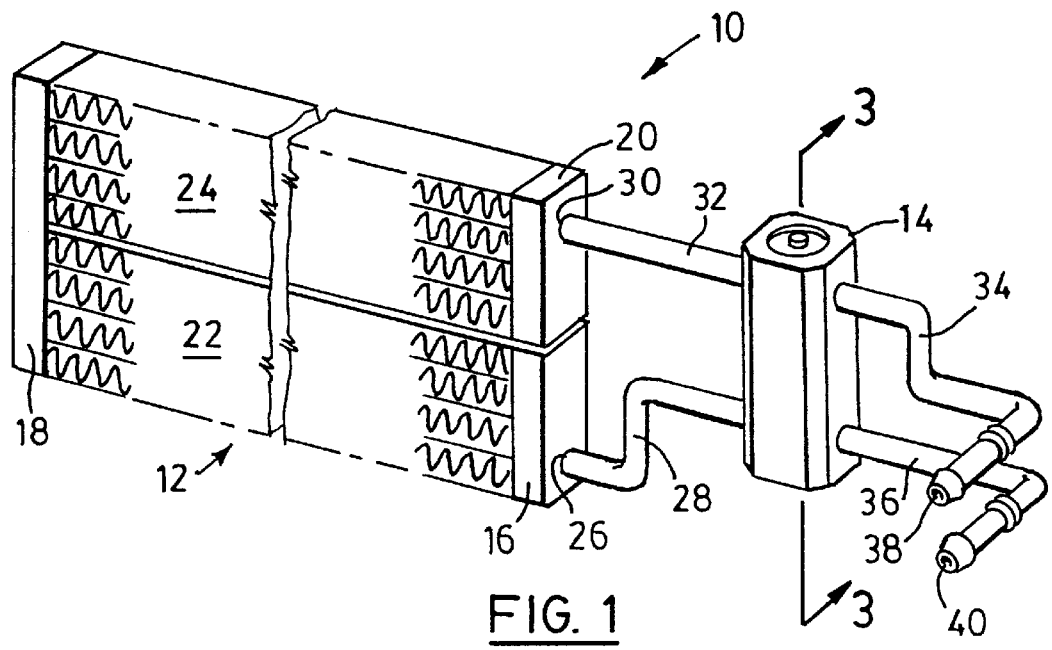
FIG. 1 is a perspective, schematic view of a heat exchanger employing a preferred embodiment of a by-pass valve according to the present invention.

Referring firstly to FIG. 1, a heat exchange circuit 10 is disclosed, which includes a heat exchanger 12, and a preferred embodiment of a by-pass valve 14 according to the present invention. Any type of heat exchanger can be used with the present invention. A typical two pass heat exchanger is shown in FIG. 1 and has a first manifold 16, which could be an inlet or an outlet manifold, a return manifold 18, and a second manifold 20. A plurality of spaced-apart heat exchange conduits 22, 24 are connected between the manifolds so, for example, if first manifold 16 is an inlet manifold, fluid flows from inlet manifold 16 through conduits 22 into return manifold 18 where it reverses direction and comes back through conduits 24 to second manifold 20, which is now an outlet manifold. The flow direction can be reversed so that second manifold 20 is the inlet manifold and first manifold 16 is the outlet manifold. It will be appreciated, however, that heat exchanger 12 could be straightened out to become a single pass heat exchanger with manifolds 16,20 located at respective ends of the heat exchanger.

In this case, return manifold 18 would not be required.

If first manifold 16 is the inlet manifold, it is formed with an inlet opening 26 and an inlet conduit 28 is connected to communicate with inlet opening 26. If second manifold 20 is the outlet manifold, it is formed with an outlet opening 30, and an outlet conduit 32 is connected to communicate with outlet opening 30. It will be appreciated, however, that if the flow direction is reversed, outlet conduit 32 becomes the inlet conduit and inlet conduit 28 becomes the outlet conduit. Conduits 28,32 are connected to inlet and outlet ports in by-pass valve 14, as will be described further below. Supply conduits 34, 36 are also connected to ports in by-pass valve 14, as will be described further below. Supply conduits 34,36 have end fittings 38, 40 for attaching flow lines to conduits 34, 36. Where heat exchanger 12 is used as a transmission oil cooler, end fittings 38, 40 can be hose barbs for attaching rubber hoses between the transmission and heat exchange circuit 10. However, any type of end fittings 38,40 can be used to suit the type of oil lines running to and from heat exchange circuit 10. By-pass valve 14 is referred to as a four port by-pass valve, because four conduits 28, 32, 34 and 36 are connected to by-pass valve 14.

Figure 2:
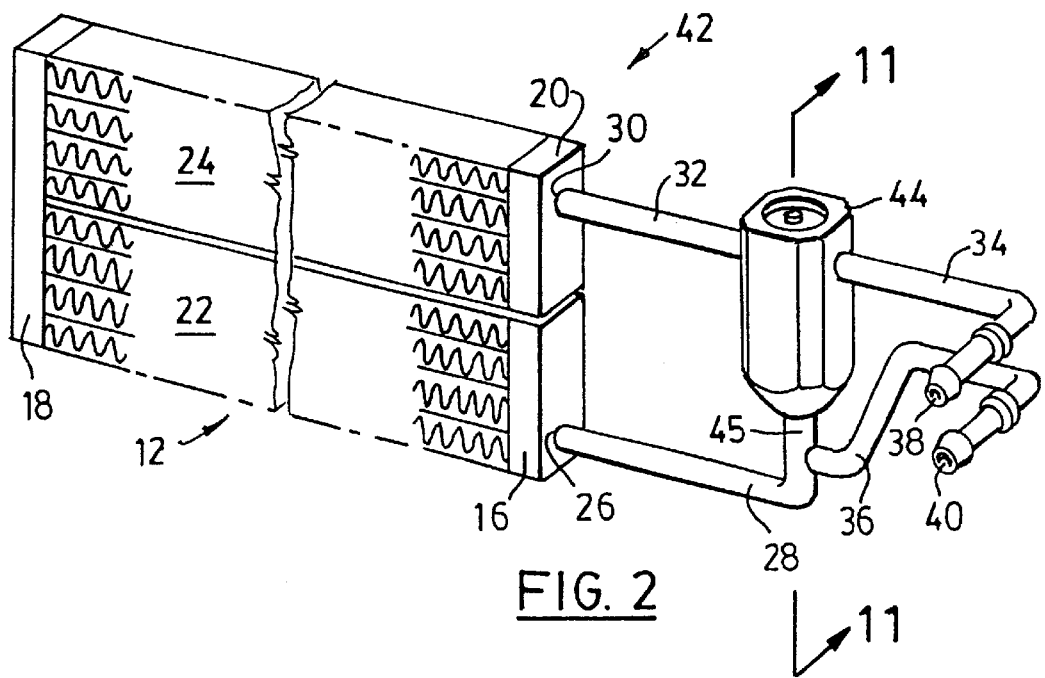
FIG. 2 is a perspective view similar to FIG. 1, but showing another preferred embodiment of a by-pass valve according to the present invention.

FIG. 2 is similar to FIG. 1 and similar reference numerals have been used in FIG. 2 and subsequent Figures to indicate components that correspond to those of the embodiment shown in FIG. 1. However, the heat exchange circuit 42 of FIG. 2 has a by-pass valve 44 which is referred to as a three port by-pass valve, because it has a single conduit 45 coming out of it that communicates with conduits 28 and 36, the purpose of which will be discussed below.

Figure 3:
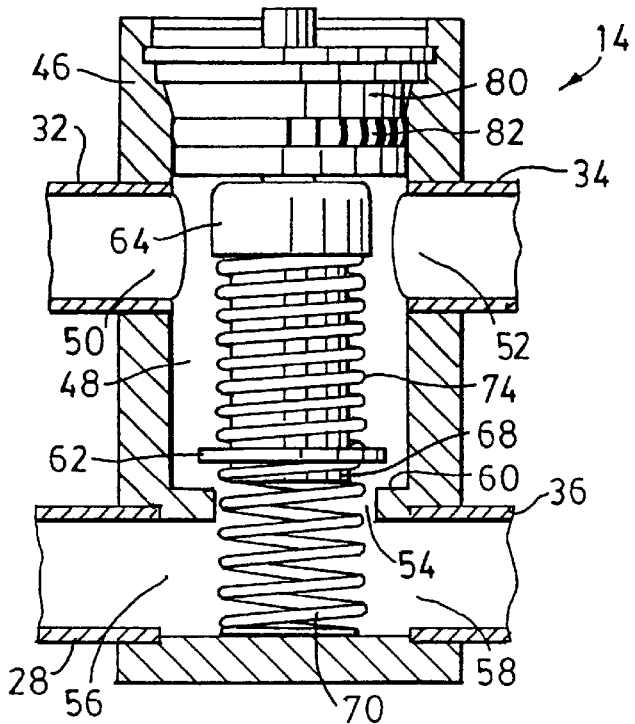
FIG. 3 is a sectional view taken along lines 3—3 of FIG. 1 showing the by-pass valve open.
Figure 4:
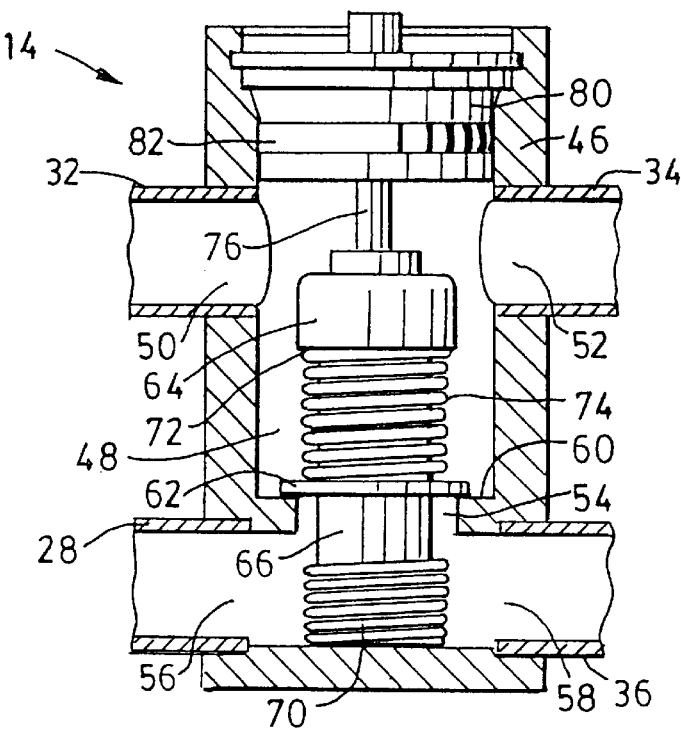
FIG. 4 is a sectional view similar to FIG. 3 but showing the by-pass valve closed.

Referring next to FIGS. 3 and 4, four port by-pass valve 14 is shown and it has a housing 46 defining a chamber 48 therein. Housing 46 has three main ports or openings 50, 52 and 54. One of these main ports, namely main port 54, is referred to as a valve port. Valve port 54 communicates with two lower branch ports 56, 58, and conduits 28, 36 are connected respectively to the branch ports 56,58.

Valve port 54 has a peripheral valve seat 60 facing chamber 48, and a movable valve member 62 is adapted to engage valve seat 60 to open and close valve port 54.

A temperature responsive actuator 64 is located inside chamber 48 and is operably coupled to valve member 62 to move valve member 62 thereby opening and closing valve port 54. Actuator 64 is sometimes referred to as a thermal motor and it is a piston and cylinder type device wherein the cylinder is filled with a thermal sensitive material, such as wax, that expands and contracts causing the actuator to extend axially upon being heated to a predetermined temperature and to retract upon being cooled below this predetermined temperature. Where by-pass valve 14 is used in conjunction with an automotive transmission oil cooler, this predetermined temperature is such that the oil returning to the transmission from heat exchange circuit 10 is about 80 degrees C.

Figure 9:
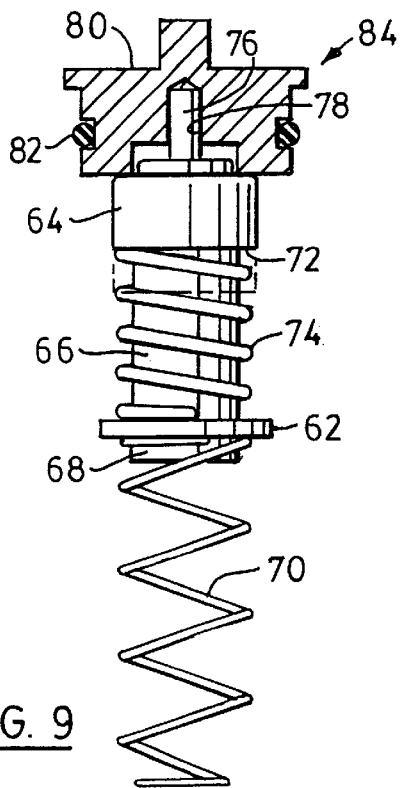
FIG. 9 is an elevational view, partly in section, of the valve cartridge or subassembly used in the by-pass valve of FIGS. 3 and 4.

Referring next to FIG. 9 in association with FIGS. 3 and 4, it will be seen that actuator 64 is located along a central axis of chamber 48 and also valve port 54. The cylinder of actuator 64 forms a central shaft 66 disposed along the central axis of valve port 54. Central shaft 66 has a closed end portion 68 that partially closes valve port 54. Valve member 62, which is in the form of a annular ring located adjacent to closed end portion 68 in its normal or at rest position as indicated in FIGS. 3 and 9, extends transversely from the central shaft 66 to engage valve seat 60 to completely close valve port 54 as indicated in FIG. 4. The annular ring 62 and closed end portion 68 form a reciprocating plug which moves along the central axis to open and close valve port 54.

Annular ring or valve member 62 is slidably mounted on central shaft 66. A return spring 70 is attached to closed end portion 68 by being located in a groove (not shown) formed in closed end portion 68. Return spring 70 thus acts as a stop for preventing annular ring 62 from sliding off central shaft 66. Central shaft 66 includes an inner annular shoulder 72, and a coil spring 74 mounted on central shaft 66 between shoulder 72 and annular ring 62 urges or biases annular ring 62 toward the stop or return spring 70, and thus toward valve seat 60.

As mentioned above, thermal motor or actuator 64 has a piston 76 that is attached or press fitted into an axial recess 78 (see FIG. 9) formed in a removable closure 80 which is part of or closes housing 46. Closure 80 has an O-ring seal 82 and is held in position by a suitable pin or set screw or other type of fastener, such as a "C"-clip or snap ring (not shown). As will be described in more detail below, when thermal motor 64 reaches a predetermined temperature, it extends axially. Since piston 76 is fixed in position, central shaft 66, which is part of thermal motor 64, moves downwardly through valve port 54 compressing return spring 70 and closing valve port 54. When the temperature inside chamber 48 drops below the predetermined temperature, thermal motor 64 retracts and return spring 70 urges central shaft 66 upwardly until return spring 70 engages annular ring 62 and lifts it off valve seat 60 again opening valve port 54. When valve port 54 is opened as indicated in FIG. 3, return spring 70 extends through valve port 54 and into chamber 48, but it does not materially affect the flow through valve port 54.

As will be apparent from FIG. 9, closure 80, thermal motor 64, coil spring 74, annular ring 62 and return spring 70 form a cartridge or subassembly 84 for by-pass valve 14. When subassembly 84 is removed from by-pass valve 14, the various conduits can be attached, such as by brazing to housing 46 without damaging thermal motor 64 or springs 70, 74. Cartridge 84 is then installed in housing 46 with closure 80 located opposite to valve port 54 and heat exchange circuit 10 is then ready for use.

The operation of by-pass valve 14 will now be described with reference to FIGS. 1, 3 and 4. Heat exchange circuit 10 can be operated with either conduit 34 or conduit 36 being the inlet conduit, the other one being the outlet conduit. Where conduit 34 is the inlet conduit, or in other words, receives hot transmission oil from the transmission, this is sometimes conveniently referred to as normal flow. In this case, conduit 36 is the outlet conduit and returns the transmission oil to the transmission after it has been cooled by heat exchanger 12.

Where conduit 36 is the inlet conduit receiving the hot transmission fluid or oil from the transmission and conduit 34 is the outlet or return conduit for delivering the cooled oil back to the transmission, this configuration is sometimes conveniently referred to as reverse flow.

Dealing first with the normal flow configuration, if the transmission oil and heat exchange circuit 10 have been warmed up to operating temperatures, by-pass valve 14 appears as in FIG. 4. Hot engine oil enters into inlet conduit 34, passes in series through main port 52, chamber 48 and main port 50 to heat exchanger inlet conduit 32. The hot fluid passes through heat exchanger 12 and returns through outlet conduit 28, passes through branch ports 56, 58 and out through outlet conduit 36 to return to the transmission. In this case, there is no by-pass flow, because valve port 54 is closed. If the fluid returning to the transmission through conduits 28, 36 drops below about 80 degrees C., actuator 64 retracts causing valve member 62 to lift off valve seat 60 opening valve port 54. This creates a by-pass flow from conduit 34 through chamber 48 and through valve port 54 to join the flow in conduit 36 returning to the transmission. If the temperature of the flow or oil is very cold, such as at engine start-up conditions, the oil may be so viscous that virtually no flow goes through heat exchanger 12 and the flow is totally by-passed from inlet conduit 34 to outlet conduit 36. As the oil starts to warm up, however, flow through conduit 32 and heat exchanger 12 starts to increase, and by the time the oil reaches the desired operating temperature, full flow is occurring through heat exchanger 12 and valve member 62 closes valve port 54 discontinuing the by-pass flow. It will be appreciated that when by-pass valve 14, or at least valve member 62, is open, valve port 54 becomes an outlet port. The other main ports 52 and 50 become respective inlet and outlet ports in this regular flow configuration.

In the regular flow configuration, one of the branch ports, namely branch port 56 becomes an inlet port, the other branch port 58 thus becomes an outlet port communicating with inlet port 56. Valve port 54 becomes an outlet port for by-pass valve 14, and the other main ports 52 and 50 become respective inlet and outlet ports for by-pass valve 14.

In the reverse flow configuration, conduit 36 becomes the inlet conduit receiving hot oil from the transmission, and conduit 34 becomes the outlet conduit returning the cooled transmission oil to the transmission. In this configuration, if the transmission and heat exchange circuit 10 are at operating temperatures, the hot transmission fluid passes through branch port 58, which becomes an inlet port. Valve member 62 is closed so there is no by-pass flow. The hot oil then continues on through branch port 56 which becomes an outlet port communicating with inlet branch port 58. The hot oil goes through conduit 28 and the heat exchanger 12 and returns through conduit 32 to pass in series through second main port 50, chamber 48 and third main port 52 and out through conduit 34 to be returned to the transmission.

If the transmission oil returning to the transmission drops below the predetermined temperature, actuator 64 causes valve member 62 to open creating by-pass flow from valve port 54 to main port 52 and conduit 34. Again, if the oil is extremely cold, such as at engine start-up conditions, very little, if any, flow passes through heat exchanger 12 and there is almost total by-pass through by-pass valve 14. As the transmission oil starts to warm up, some flow starts to go through heat exchanger 12 and returns through conduit 32 to chamber 48 and back to the transmission through conduit 34. This causes actuator 64 to warm up faster than would otherwise be the case. As the transmission oil returning to the transmission through outlet conduit 34 reaches the predetermined temperature, actuator 64 extends closing valve member 62 and stopping the by-pass flow. In this configuration, any pressure peaks that might occur upon the closing of valve member 62 are attenuated or modulated, because valve member 62 can lift off valve seat 60 by such a pressure surge, since valve member 62 is urged into position by coil spring 74 and not solidly in engagement with valve seat 60. In other words, coil spring 74 can absorb pressure spikes in inlet conduits 36, 28, so that they do not travel back and adversely affect the transmission. The circuiting of the valve is such that the housing functions as a mixing chamber, in which the by-pass fluid stream and the heat exchanger outlet stream can mix in direct contact with the thermal actuator, so that thermal transients are damped, and the actuator is able to directly respond to the mixed oil temperature being returned to the transmission. Also during the transition between opening and closing, the hot by-pass stream and cooler oil cooler return stream are mixed (as controlled by the directing contacting actuator 64) to dampen any temperature transients in the oil being returned to the transmission.

In the reverse flow configuration, valve port 54 becomes an inlet port for by-pass valve 14 and the other main ports 50, 52 become respective inlet and outlet ports for by-pass valve 14.

Another advantage of by-pass valve 14 is that because actuator 64 is located in chamber 48 with oil continuously flowing therethrough, actuator 64 warms up and cools off quickly. Also, if the transmission oil becomes over-heated or experiences a temperature spike, actuator 64 is not damaged, because it is always exposed to some return flow from heat exchanger 12 in chamber 48 in the reverse flow configuration, or in branch ports 56, 58 in the regular flow configuration. Further, if actuator 64 is overheated and tends to expand too far, it will not be damaged, because central shaft 66 can extend through valve port 54 as much as is required. There are no physical stops or constraints to limit the expansion of actuator 64.

As mentioned above, by-pass valve 14 has three main ports. If valve port 54 is considered to be the first main port, conduits 28, 36 can be considered to be a first flow conduit communicating with valve port 54 and one of the inlet and outlet openings of heat exchanger 12, depending upon whether by-pass valve 14 is operated in the regular flow or reverse flow configuration. Depending upon whether valve port 54 is connected to the inlet or the outlet of heat exchanger 12, a second main port, namely main port 50, is connected to the other of the inlet and outlet openings of heat exchanger 12. A second flow conduit, namely conduit 34, communicates with the third main port, namely main port 52 of by-pass valve 14. As thus described, in the reverse flow configuration, the first flow conduit 28, 36 is the heat exchanger inlet. The second conduit 34 through conduit 32 becomes the heat exchanger outlet. In the regular flow configuration, the first flow conduit 28, 36 becomes the heat exchanger outlet, and the second flow conduit 34 through conduit 32 becomes the heat exchanger inlet.

Figure 5:
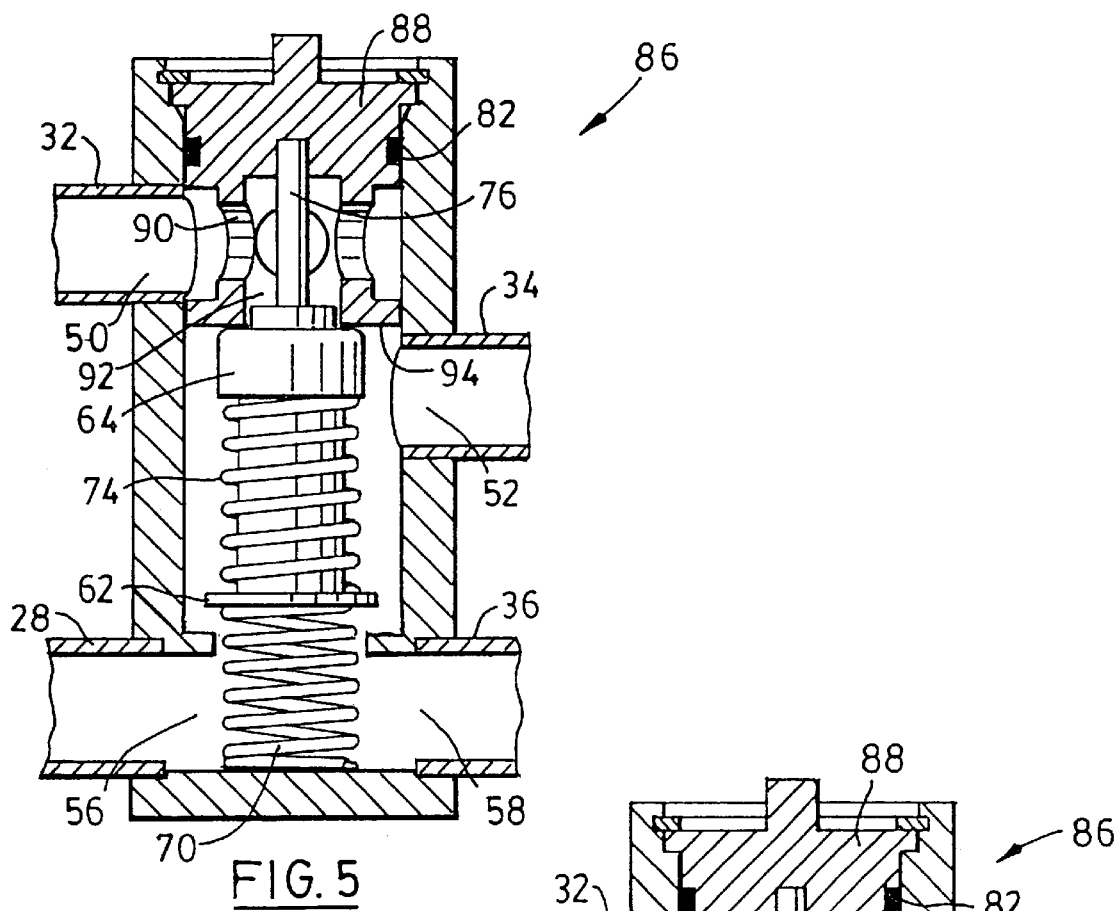
FIG. 5 is a sectional view similar to FIG. 3, but showing a modification for blocking flow to the heat exchanger.
Figure 6:
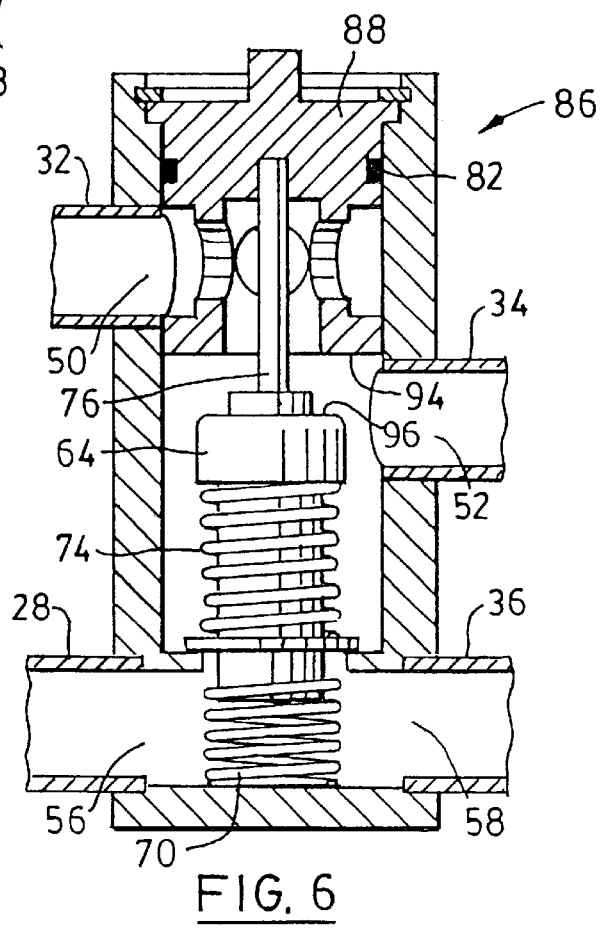
FIG. 6 is a sectional view similar to FIG. 5 but showing the by-pass valve closed and the heat exchanger unblocked.
Figure 7:
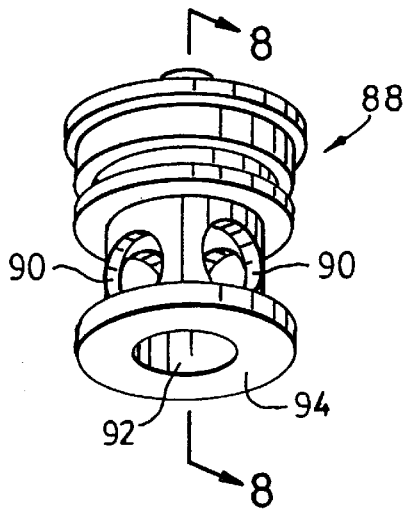
FIG. 7 is a perspective view of the removable closure used in the by-pass valve of FIGS. 5 and 6.
Figure 8:
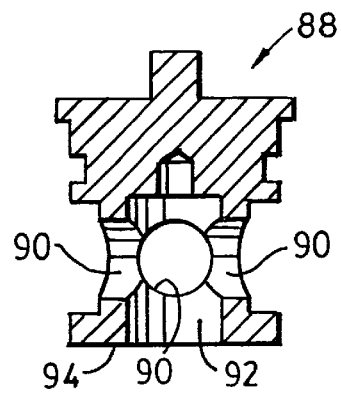
FIG. 8 is a sectional view taken along lines 8—8 of FIG. 7.

Referring next to FIGS. 5, 6, 7 and 8, another preferred embodiment of a by-pass valve 86 is shown which is similar to by-pass valve 14, but makes provision for totally blocking the flow to heat exchanger 12 in the by-pass open configuration. In by-pass valve 86, removable closure 88 has a plurality of side ports 90, one of these side ports communicating with main port 50. Closure 88 also has an axial port 92 communicating with side ports 90. Axial port 92 has a peripheral valve seat 94, and thermal motor 64 has a second annular shoulder 96 that forms a second valve member that is adapted to engage the peripheral valve seat of axial port 92 and thus block the flow to or from main port 50 when valve member 62 is in the open position as indicated in FIG. 5. It will be noted that in this embodiment, main port 52 is located slightly lower than in by-pass valve 14 in order to accommodate the longer removable closure 88. Otherwise, the construction and operation of by-pass valve 86 is substantially the same as in the case of by-pass valve 14. By-pass valve 86 is particularly useful where a large heat exchanger 12 is used having a relatively low internal flow resistance in cold flow conditions. In this case, it is better to block the flow to heat exchanger 12 using the upper valve element consisting of shoulder 96 and valve seat 94, or too much cold oil may be returned to the transmission causing it to take too long to warm up.

Figure 10:
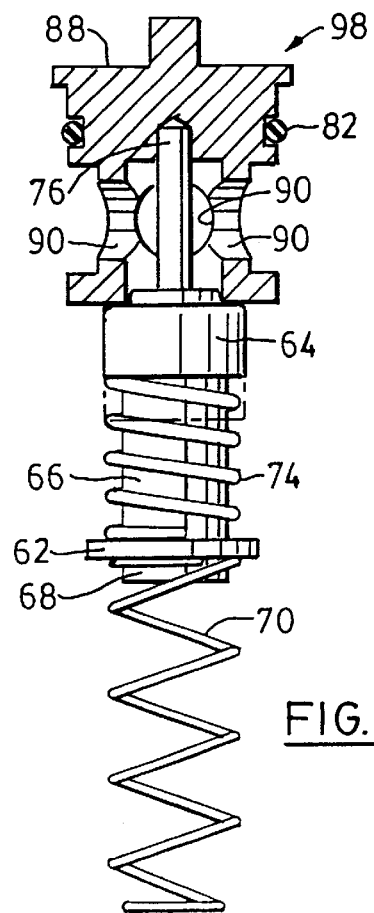
FIG. 10 is an elevational view, partly in section, of the valve cartridge or subassembly used in the by-pass valve of FIGS. 5 and 6.

FIG. 10 shows a subassembly or cartridge 98 for by-pass valve 86. It will be noted that cartridge 98 is similar to cartridge 84 of FIG. 9, except for the longer removable closure 88.

Figure 11:
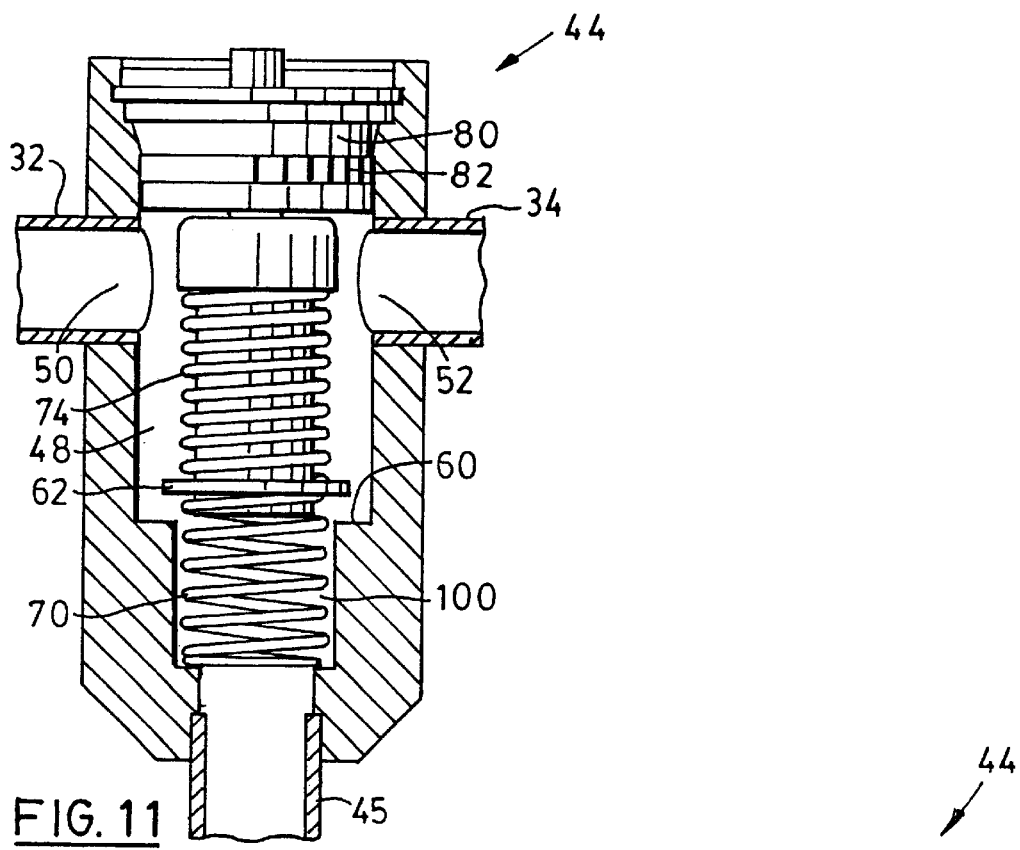
FIG. 11 is an elevational view similar to FIG. 3, but taken along lines 11—11 of FIG. 2 and showing a three port by-pass valve.
Figure 12:
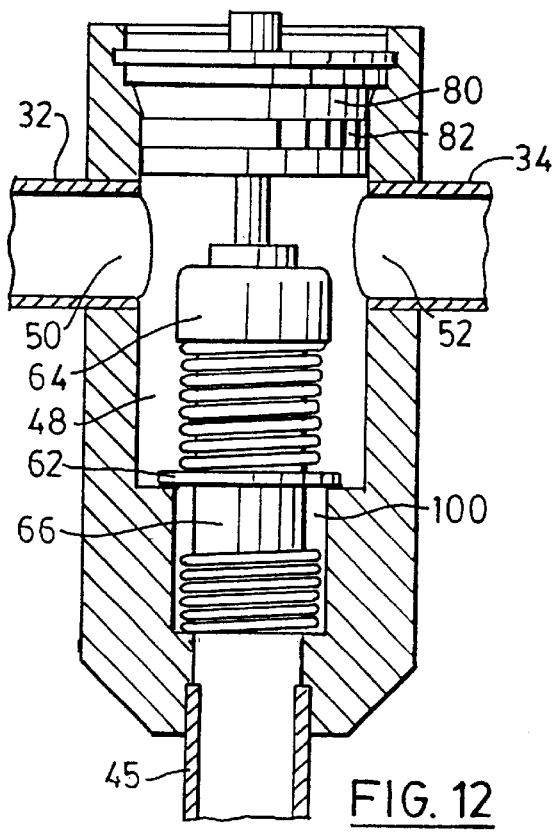
FIG. 12 is an elevational view similar to FIG. 11 but showing the by-pass valve closed.

Referring next to FIGS. 2, 11 and 12, three port by-pass valve 44 will now be described in further detail. By-pass valve 44 is similar to by-pass valve 14, except that by-pass valve 44 has an enlarged main or valve port 100, and a single conduit 45 communicates with valve port 100. As seen in FIG. 2, conduit 45 is connected to conduits 28 and 36. In the reverse flow configuration, conduit 36 is the inlet to heat exchanger 12 and receives hot oil from the transmission. This oil flows upwardly through conduit 45 and through valve port 100 when the by-pass valve element 62 is open. The by-pass flow then travels through chamber 48 to main port 52 and conduit 34. When valve member 62 is closed, so that there is no by-pass flow, oil coming from the transmission through conduit 36 flows into conduit 28 and through heat exchanger 12 to be returned to the transmission through conduits 32, 34 as in the case of by-pass valve 14. In the regular flow configuration, oil from the transmission flows through conduit 34, chamber 48 and conduit 32 into heat exchanger 12. Oil from the heat exchanger passes out through outlet conduit 28, and if valve element 62 is closed so that there is no by-pass flow, the oil flows through conduit 36 and back to the transmission. If valve element 62 is open, so there is by-pass flow, oil from conduit 34 passes through valve port 100 and back to the transmission through conduit 36.

Figure 13:
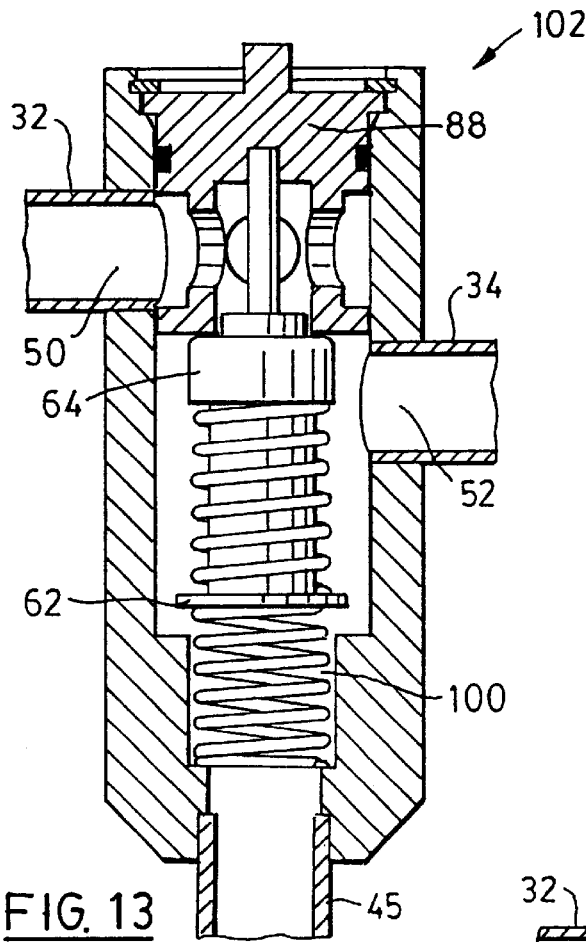
FIG. 13 is an elevational view similar to FIG. 5, but showing a three port by-pass valve.
Figure 14:
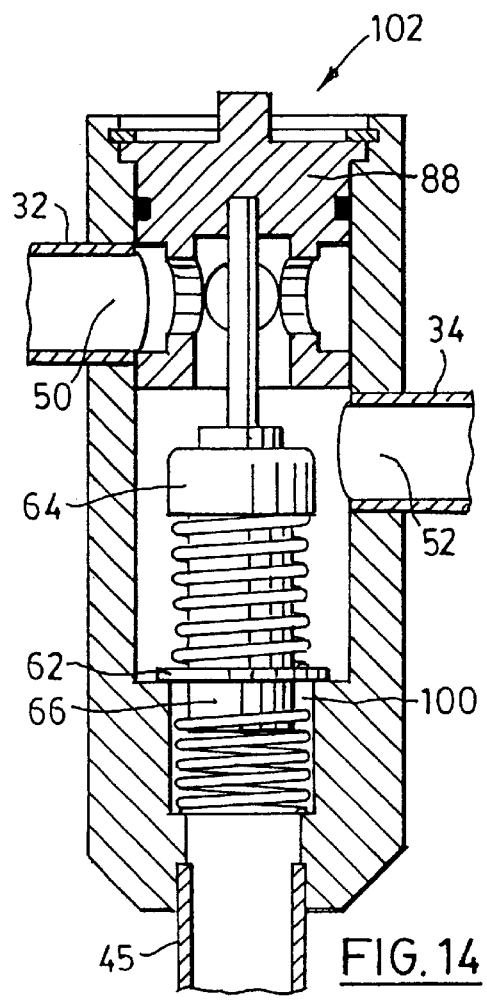
FIG. 14 is an elevational view similar to FIG. 13 but showing the by-pass valve closed.

FIGS. 13 and 14 show a three port by-pass valve 102 that has the single conduit 45 communicating with valve port 100 as in the case of by-pass valve 44 of FIGS. 11 and 12. By-pass valve 102 also has the ported removable closure 88 as in the case of by-pass valve 86 of FIGS. 5 and 6 to provide the flow blockage to the heat exchanger when the by-pass valve member 62 is open.

Having described preferred embodiments of the invention, it will be appreciated that various modifications can be made to the structures described above. Firstly, although by-pass valves 14, 44, 86 and 102 have been described as being discrete or separate items from heat exchanger 12 and the various conduits communicating with the by-pass valves, the by-pass valves could be integrated into the inlet and outlet manifolds 16, 20, or they could be joined directly to the inlet and outlet manifolds 16, 20 instead of using conduits 28, 32. In this case, if the valve port is the first main port and it is connected to one of the inlet and outlet openings 26, 30, the second main port 50, the chamber 48 and the third main port 52 could be connected in series directly to the other of the inlet and outlet openings 26, 30. More specifically, if the valve port 54 is connected to the heat exchanger inlet opening 26, either directly or through a conduit, the second main port 50, chamber 48 and third main port 52 could be connected in series directly or through a conduit to outlet opening 30, the third main port 52 then becoming the heat exchanger outlet returning the oil to the transmission. Similarly, if the valve port 54 is connected to heat exchanger outlet opening 30 either directly or through a conduit, the second main port 50, chamber 48 and third main port 52 could be connected in series directly or through a conduit to heat exchanger inlet opening 26, the third main port 52 then becoming the heat exchanger inlet receiving the hot oil from the transmission.

Valve member or annular ring 62 could be in the form of a longitudinally slotted sleeve with a lower transverse flange to engage valve seat 60. In this case, spring 74 would not have to act as a stop to prevent ring 62 from sliding off central shaft 66. Ring 62 would stay in place against valve seat 60 and central shaft 66 could retract behind ring 62 to allow by-pass flow through the slots in the sleeve.

The by-pass valves have been described above for use with an automotive transmission oil cooler as the heat exchanger, but the by-pass valves could be used with any other types of heat exchanger, such as fuel cooling heat exchangers, and in non-automotive applications as well. Other types of thermal actuators can be used than the wax-type actuator 64. For instances, bimetallic or shape memory alloy thermal responsive actuators could be used to move valve member 62 and also give heat exchanger blockage as in by-pass valves 86 and 102. Further modifications to the structures described will be apparent to those skilled in the art.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A by-pass valve for a heat exchanger circuit, the by-pass valve comprising:

a housing defining a chamber therein and first, second and third main ports communicating with the chamber, the first main port being a by-pass valve port, the valve port having a central axis and a peripheral valve seat; a temperature responsive actuator located in the chamber and having a reciprocating central shaft disposed along said central axis, the central shaft having a closed end portion for partially closing the valve port; an annular ring slidably mounted on the closed end portion and extending transversely from the central shaft to engage the valve seat and completely close the valve port; bias means for urging the annular ring toward the valve seat; and a return spring mounted in the housing below the annular ring and being connected to the central shaft to urge the central shaft end portion to retract and open the valve port.

2. A by-pass valve as claimed in claim 1 wherein the closed end portion includes a stop for preventing the annular ring from sliding off the central shaft.

3. A by-pass valve as claimed in claim 2 wherein the central shaft includes an inner annular shoulder, and wherein the bias means is a coil spring mounted on the shaft between the inner shoulder and the annular ring.

4. A by-pass valve as claimed in claim 3 wherein the actuator is a thermal motor adapted to extend axially upon being heated to a predetermined temperature and retract upon being cooled below said temperature, and wherein the central shaft is part of the thermal motor.

5. A by-pass valve as claimed in claim 4 wherein the housing includes a removable closure located opposite to the valve port, the thermal motor having a piston connected to said closure; the closure, thermal motor, coil spring, annular ring and return spring forming a subassembly for the by-pass valve.

6. A by-pass valve as claimed in claim 2 wherein the housing further includes first and second branch ports communicating with the valve port.

7. A by-pass valve as claimed in claim 4 wherein the housing further includes first and second branch ports communicating with the valve port.

8. A by-pass valve as claimed in claim 4 wherein the housing includes a removable closure located opposite to the valve port, the thermal motor having a piston connected to said closure.

9. A by-pass valve as claimed in claim 8 wherein the removable closure has a side port and an axial port communicating therewith, the side port being located to communicate with one of the main ports, and the axial port having a peripheral valve seat, the thermal motor having a second annular shoulder forming a second valve member adapted to engage the axial port valve seat and thus block said one main port.

10. A heat exchanger comprising: an inlet manifold having an inlet opening and an outlet manifold having an outlet opening; a plurality of spaced-apart heat exchange conduits connected between the inlet and outlet manifolds; a by-pass valve including a housing defining a chamber therein and first, second and third main ports communicating with the chamber, the first main port being a by-pass valve port, the valve port having a central axis and a peripheral valve seat; means for connecting the valve port to one of the inlet and outlet openings; a temperature responsive actuator located in the chamber and having a reciprocating central shaft disposed along said central axis, the central shaft having a closed end portion for partially closing the valve port; an annular ring slidably mounted on the closed end portion and extending transversely from the central shaft to engage the valve seat and completely close the valve port; bias means for urging the annular ring toward the valve seat; a return spring mounted in the housing below the annular ring and being connected to the central shaft to urge the central shaft end portion to retract and open the valve port; and means connecting the second main port, the chamber and the third main port in series with the other of the inlet and outlet openings.

11. A heat exchanger as claimed in claim 10 wherein the valve port is connected to communicate with the heat exchanger inlet opening and the second main port, the chamber and the third main port are connected in series with the heat exchanger outlet opening, the third main port becoming the heat exchanger outlet.

12. A heat exchanger as claimed in claim 10 wherein the valve port is connected to communicate with the heat exchanger outlet opening and the second main port, the chamber and the third main port are connected in series with the heat exchanger inlet opening, the third main port becoming the heat exchanger inlet.

* * * * *

UNITED STATES PATENT AND TRADEMARK OFFICE
CERTIFICATE OF CORRECTION

PATENT NO. : 6,253,837 B1 Page 1 of 1
DATED : July 3, 2001
INVENTOR(S) : Seiler et al.

It is certified that error appears in the above-identified patent and that said Letters Patent is hereby corrected as shown below:

<u>Title page, Item [54] and Column 1, line 1,</u>
Delete "VALUES" and substitute therefor -- VALVES --

Signed and Sealed this

Sixth Day of January, 2004

JAMES E. ROGAN
*Director of the United States Patent and Trademark Office*